Inventor
JEROMAIE ROMINE,

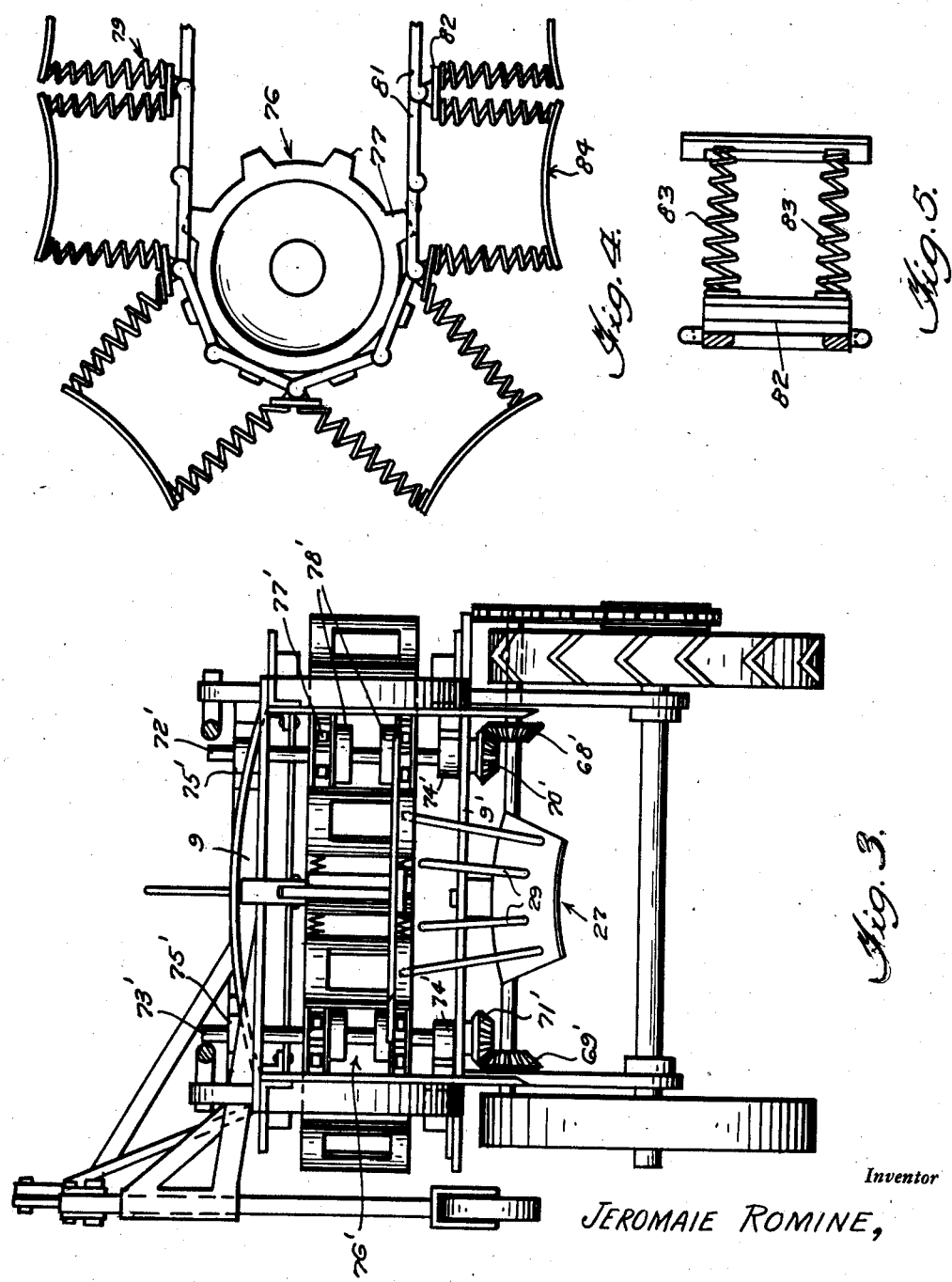

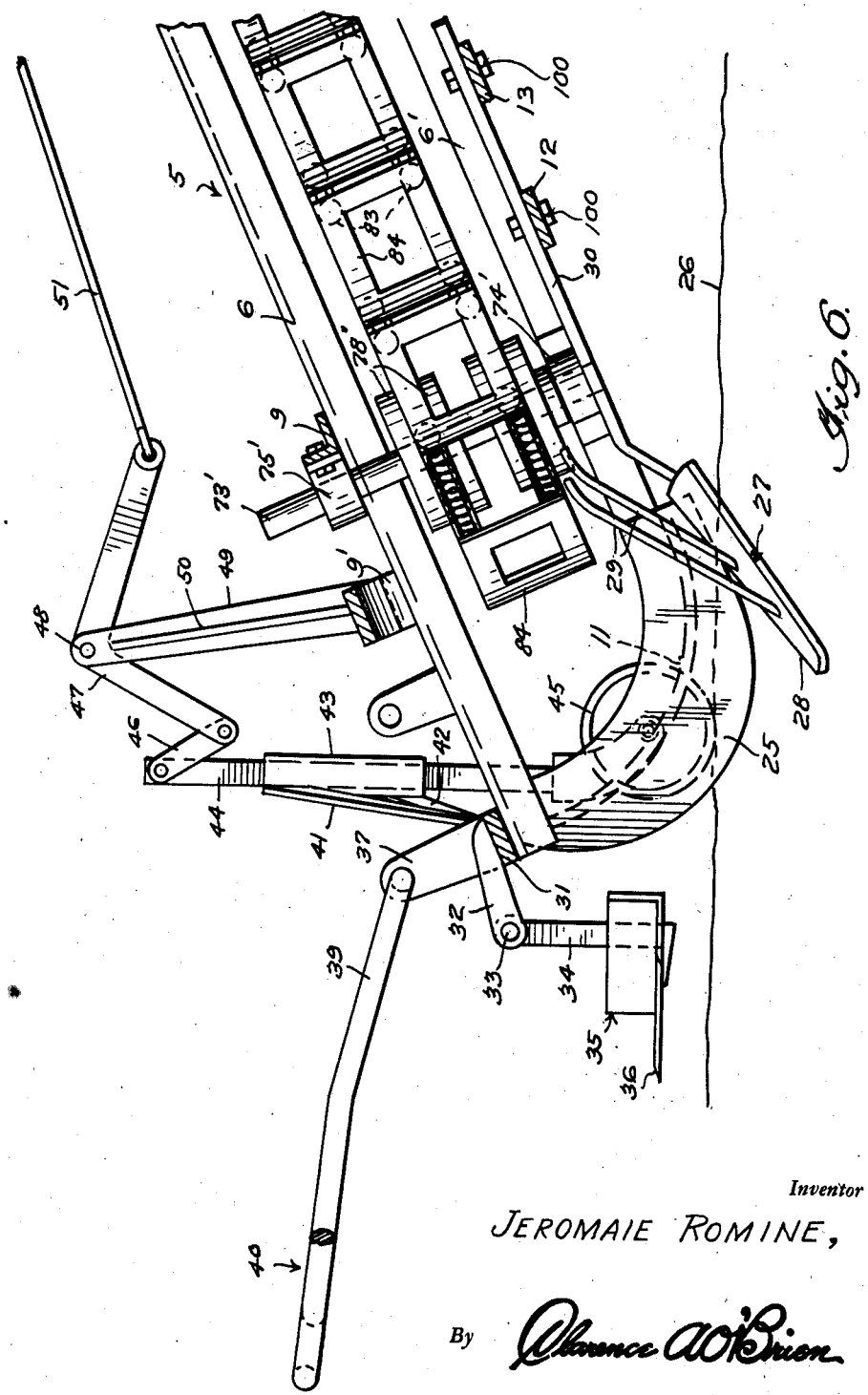

Patented Oct. 27, 1942

2,300,063

UNITED STATES PATENT OFFICE 2,300,063

MACHINE FOR DIGGING, TOPPING, AND ROOTING BEETS AND OTHER VEGETABLES

Jeromaie Romine, Phoenix, Ariz.

Application December 29, 1941, Serial No. 424,826

3 Claims. (Cl. 55—108)

My invention relates to improvements in apparatus for digging beets and other vegetables from the ground and cutting off the tops and roots thereof, while the vegetables are in transit along the machine to a designated destination, and the primary object of my invention is to provide a practical and relatively simple arrangement of the character indicated which can be arranged to deliver the topped and rooted vegetables either in a row upon the ground behind the machine as it moves along, or to deliver the vegetables upon a conveyor or to another part of a following vehicle.

Other important objects and advantages of my invention will be apparent from a reading of the following description taken in connection with the appended drawings, wherein for purposes of illustration I have shown a preferred embodiment of my invention.

In the drawings:

Figure 3 is a transverse vertical sectional view taken through Figure 1 along the line 3—3 and looking toward the right in the direction of the arrows and showing the front end of the embodiment raised out of operative position.

Figure 4 is an enlarged fragmentary top plan view showing one of the chain sprockets and the chain trained thereover and equipped with the resilient spring-pressed grips.

Figure 5 is a fragmentary transverse vertical sectional view taken through one of the grips in Figure 4.

Figure 6 is an enlarged fragmentary longitudinal sectional view taken through Figure 2 along the line 6—6 and looking upwardly in the direction of the arrows.

Figure 8 is a top plan view of an alternate form of plow.

Figure 9 is a side elevational view thereof.

Figure 7:
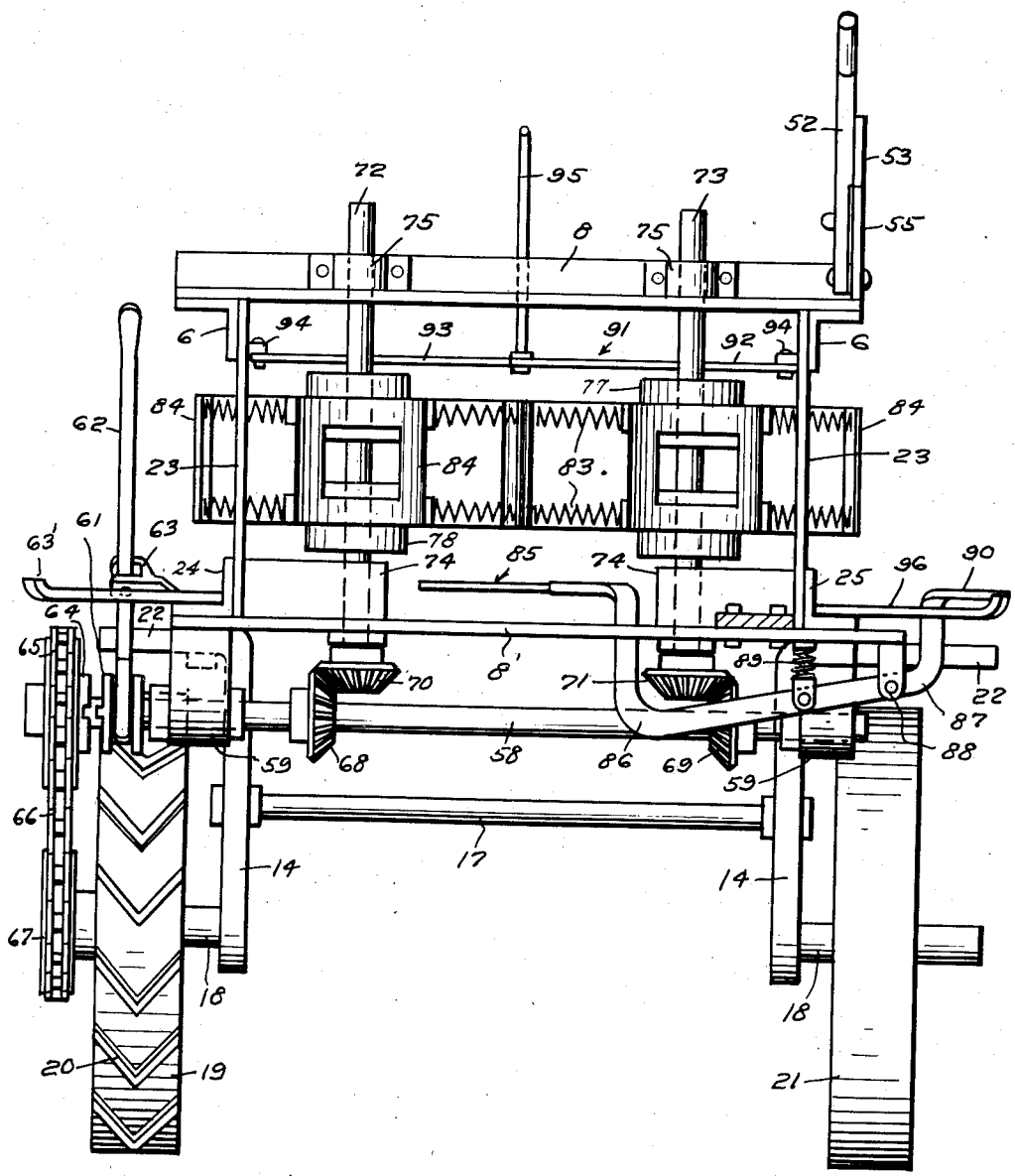
Figure 7 is an enlarged rear elevational view of the embodiment.

Referring in detail to the drawings, the numeral 5 generally designates the generally rectangular slightly forwardly tapering frame of the illustrated machine which consists of angle iron longitudinal side members 6 spaced and connected by flat bars 7 and 8 at the front and rear ends thereof and further spaced and connected by the front angle iron cross member 9 and a rear cross member angle iron 10, all characterizing the upper part of the frame. Spaced below the longitudinal side members 6 are the angle iron longitudinal side members 6' which have the forward end portions thereof upwardly curved as indicated by the numeral 11 in the manner of a sled runner or the like, with the upper end of the curved portion 11 joined to the forward extremity of the upper longitudinal side members 6. Flat bar cross members 12 and 13 are secured to the bottom flanges of the lower longitudinal side members 6, while additional similar cross members paralleling the upper cross members 10 and 8, space and connect the lower longitudinal side members 6'. Inverted L-shaped brackets 14, joined by forward and rearward diagonal braces 15 and 16, respectively, are all connected to the lower longitudinal side members to depend therefrom. The braces 15 and 16 are connected to the opposite ends of a shaft 17 which spaces and connects the inverted L-shaped brackets 14 as indicated in Figure 7 of the drawings. The lower extremities of the standard portions of the L-shaped brackets have pintles 18 projecting laterally outwardly therefrom and on which the ground engaging wheels are mounted. The left hand wheel 19 has cleats 20 and is the power wheel, while the left hand ground engaging wheel 21 may be smooth. The horizontal portions 22 of the brackets 14 project laterally outwardly from the sides of the frame to the lower side rails of which they are secured. Vertical bars 23 are connected to flanges 24 and 25 of the opposite end portions of the upper and lower rear cross members 8 and 8' of the frame 5 as clearly indicated in Figure 7 of the drawings.

The inner sides of the curved runner-like portions 11 comprise bolo-shaped knives 25 which present upwardly and forwardly curving edges. The blades 25 are spaced laterally inwardly from the sides of the frame and are themselves spaced at a sufficient distance to cut the opposite side limits of the ground 26 which is to be dug up by the plow which is generally designated 27 and which as shown in Figure 6 of the drawings is downwardly and forwardly inclined below the level of the knives 25 and in a position to the rear thereof. The plow 27 has a slightly convex upper surface 28 from laterally spaced points of which project rearwardly diverging fingers or rods 29 which are upwardly and rearwardly inclined to cause the dug vegetables to climb along the fingers toward the conveyor mechanism to be described. The plow is supported on a longitudinally arranged flat bar 30 which rises from a point of connection underneath the rear of the plow to a level with the lower chassis side members 6', as indicated in Figure 6 of the drawings, the bar 30 being attached upon the already described cross members 12 and 13, in a position substantially midway between the lower chassis side members 6'.

Across the front ends of the upper chassis side members 6 is secured a heavy transverse bar 31 from the middle of which projects forwardly a rigid arm 32 on the clevis formed front end of which is pivoted as indicated by the numeral 33 the upper end of a dependent arm 34 whose lower portion carries a heavy L-shaped cross section knife 35 for cutting the heavy tops of the vegetables before the same are dug from the ground, the horizontal transversely angulated edge 36 of the heavy knife acting to sever the tops of the plants, in advance of the knives 25 and the plow 27. Also affixed to the opposite ends of the heavy bar 31 are the standards 37 to the upper ends of which are pivotally connected the laterally directed pintles 38 on the rearwardly diverging arms 39 of the draft bar arrangement which is generally designated 40 and which is adapted to be attached to a tractor vehicle (not shown).

Secured to the right front portion of the frame 5 and positioned laterally outwardly therefrom by the bars 41 and 42 is the vertical sleeve 43 through which slides the vertical standard 44 on whose lower end is mounted the caster wheel 45 which engages the ground 26 at the side of the device. The bar 44 is vertically adjustable to vary the contact of the caster wheel 45 with the ground and thereby adjust the depth of engagement of the plow and of the knives 25 with the ground by means of the link 46 which is pivoted at one end to the upper end of the slide bar 44 and at its opposite end to one arm of the bellcrank 47 whose fulcrum portion is pivoted as indicated by the numeral 48 on a heavy standard 49 which rises from the right hand side of the frame 5 and has a laterally extending brace 50 anchored intermediate the ends of a flat bar cross member 9' which is connected at its opposite end to the upper chassis side members 6 somewhat forward of the angle iron cross member 9, as shown in Figure 6 of the drawings. An operating rod 50 is connected to the remaining arm of the bellcrank 47 and extends in a generally horizontal position to connect at its rear end with the operating lever 52 which has a spring-pressed dog 53 to selectively engage notches 54 in the locking segment 55 which is mounted on the rear part of the right hand upper chassis side member 6. A driver and operator's seat 56 is mounted by a bracket 57 projecting upwardly and rearwardly from the lower rear cross member 8'.

A transversely arranged driven shaft 58 mounted in similar bearings 59 secured to depend from the rear part of the lower chassis side member 6' has splined thereon at the left hand end thereof outside of the chassis the slidable but non-rotatable clutch element 61 which is operated by the clutch lever 62 pivotally mounted as indicated by the numeral 63, the element 61 being engageable with the stationary clutch element 64 which is freely rotatable on the shaft 58 and which involves a sprocket 65 over which is trained the sprocket chain 66 which is trained over the sprocket wheel 67 which is fixed on the hub of the ground engaging power wheel 19. Obviously, shifting the clutch element 61 into engagement with the clutch element 64 connects the power wheel 19 to drive the shaft 58.

The driven shaft 58 has oppositely facing bevel gears 68 and 69 which are respectively in mesh with bevel gears 70 and 71 which are fixed on the lower ends of the rear parallelly spaced vertically rotary shafts 72 and 73 which are journaled adjacent their lower ends in similar bearings 74 and supported from the lower side members 6' of the chassis frame and adjacent their upper ends by bearings 75 which are attached to the upper rear angle iron cross member 8. On each of the shafts 72 and 73 is a gear in the form of a cage 76 and having widely spaced teeth 77 on upper and lower levels as indicated in Figure 3 of the drawings with respect to the similar gears at the front of the machine, with relatively large hubs 78 below the upper level and above the lower level as indicated.

Similarly arranged and constructed vertical shafts 72' and 73', respectively, are mounted in upper bearings 75' on the front cross member 9, the said shafts having their lower ends supported in lower bearings 74' carried by the lower chassis side members 6' as indicated in Figures 3 and 6. The shafts 72' and 73' are idle in their bearings.

Trained around the gear cages 76 and 76' on the longitudinally paired shafts 72', 72, and 73', 73 are the individual endless belts 79 and 80 at the right hand and left hand sides of the frame 5, respectively.

Figure 2:
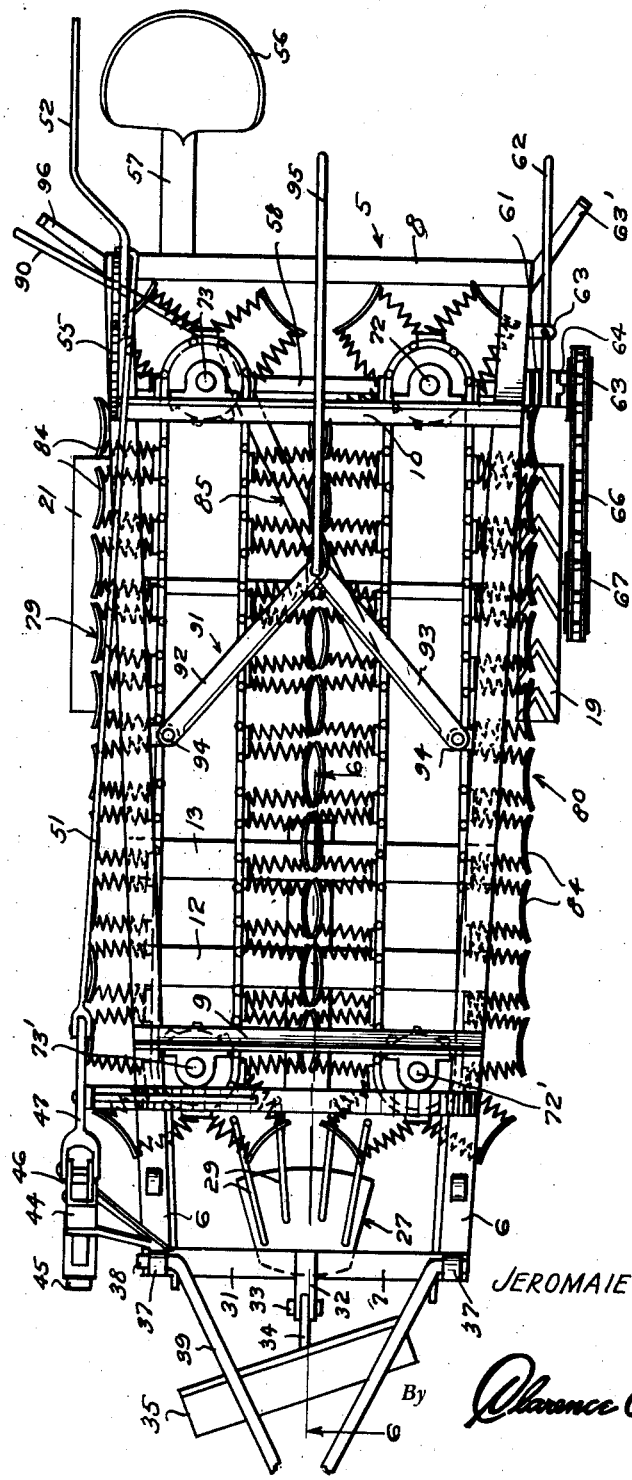
Figure 2 is a general top plan view of Figure 1.

Each of the said belts consists of a plurality of connected open vertically elongated links 81 which consist of upper and lower flights with openings to receive the wide spread teeth 77 on the upper and lower levels of the gear cages around which the conveyors are trained as indicated in Figures 2 and 6. Pivotally mounted at the juncture of each adjacent pair of links 81 is a vertically elongated plate 82 which has laterally spaced pairs of tapering helical springs 83 fastened thereto and projecting in a laterally outward direction in side by side relation as indicated in Figures 4 and 5 of the drawings. Cups 84 or vegetable grips consist of open frames having their convex sides directed laterally outwardly, with the small ends of the springs 83 connected to their four corners as indicated in phantom lines in Figure 6 of the drawings, each cup or grip spanning two links 81 as indicated in Figure 4 of the drawings. The described parts are so proportioned that the laterally inward flights of the two grip belts press their grips or cups 84 against each other as indicated in Figure 2 of the drawings so that any vegetable placed therebetween is securely held. As indicated in Figures 2 and 4 of the drawings the opposed cups come together in a divergent relationship at the front end of the chassis frame and just above the rear terminals of the vegetable guide bars 29, so as to gather the vegetable between the grips in a gradual closing action of the grips which achieves a secure clamping action on the vegetable as the grips come to the fully closed position in which the grips remain until the rear part of the chassis frame is reached in the travel of the belts. At this point the grips open away from each other again as indicated in Figure 2 of the drawings so as to free the vegetable.

Beneath the described belts is the lower angulated cutter knife 85 against which the lower parts of the beets or the like are pushed by the travel of the belts so as to cut off the roots of the beets or the like, and this knife 85 is supported on an L-shaped bracket 86 which has a part 87 extending transversely of the chassis frame and pivoted at its laterally outward end on a bracket 88 depending from the rear lower cross member 8' at the right hand end thereof as indicated in Figure 7 of the drawings. An expanding spring arrangement 89 is operatively disposed between the rear cross member 8' and the transverse part 87 of the bracket 88 to normally press the knife 85 downwardly. The portion 87 has a foot pedal portion 90 projecting from the right hand side of the frame, enabling the operator seated on the seat 56 to raise or lower the knife 85 as may be desirable to cut off the roots of the vegetables coming along with the belts.

Figure 1:
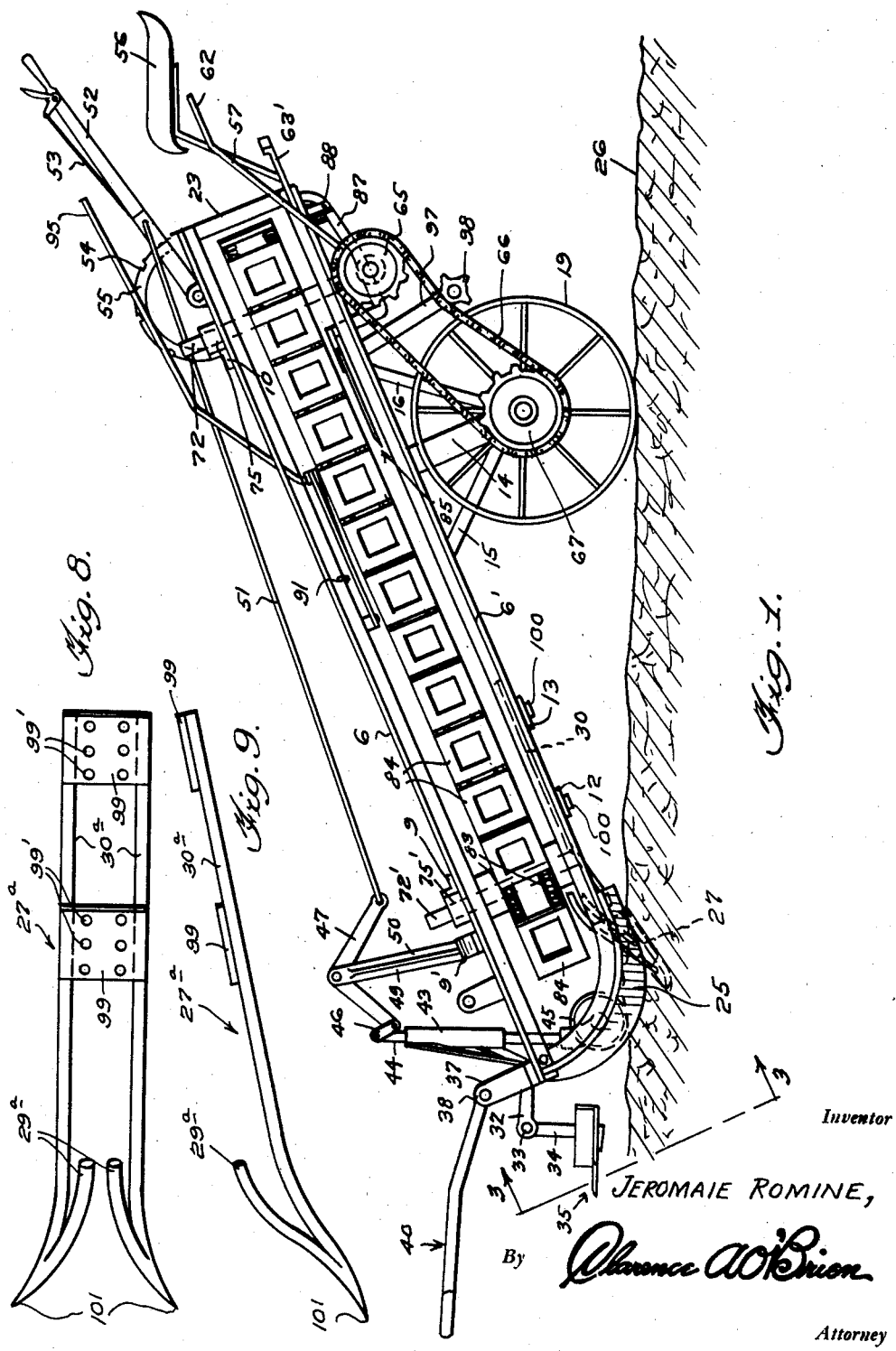
Figure 1 is a general left hand side elevational view of the embodiment showing the same in digging position.

To cut off the tops of the beets or the like as they are carried rearwardly by the belts there is provided an articulated V-shaped knife 91 which consists of divergent knife elements 92 and 93 which are loosely pivoted at their forward ends as indicated by the numerals 94 to elements on the upper side members 6 of the chassis frame and are together pivoted at their rearward ends to the forward end of a manually adjustable bar 95 which extends centrally above the frame 5 to within reach of the operator on the seat 56. A stirrup or foot rest 96 projects from the right hand rear end portion of the chassis frame under the pedal 90 so that the pedal 90 may be easily operated by the foot of the driver seated on the seat 56 to adjust and operate the lower knife 85. As indicated in Figure 1 of the drawings, a bracket 97 may depend from the left hand side of the chassis frame to carry an idler gear 98 against the lower side of the lower flight of the sprocket chain 66 to maintain the sprocket chain tight.

The alternative plow 27a shown in Figures 8 and 9 consists of substantially parallel round rods welded to two longitudinally spaced plates 99 provided with longitudinally and laterally spaced holes 99' to selectively accommodate the bolts 100 for securing to the cross members 12 and 13. The rear ends of the rods are curved slightly downwardly and laterally outwardly as shown in Figure 8 and terminate in points 101. From the points the arms 29a are curved inwardly and upwardly to lift the dug vegetables to the conveyor arrangement.

Although I have shown and described herein a preferred embodiment of my invention, it is to be definitely understood that I do not wish to limit the application of the invention thereto except as may be required by the scope of the subjoined claims.

Having described the invention, what is claimed as new is:

1. An ambulatory machine for digging beets or the like out of the ground and conveying the dug beets or the like rearwardly and cutting the tops and roots therefrom and discharging the topped and rooted beets at the rear of the machine, said machine comprising a chassis frame having a pair of rearwardly placed ground engaging wheels one of which is a drive wheel, a forwardly placed vertically adjustable caster wheel supporting the front part of the chassis frame on the ground, a beet digging and elevating shovel consisting of a downwardly and forwardly depressed plow mounted at the forward part of the chassis frame with rearwardly inclined beet guiding means thereon, a pair of side by side endless conveyor belts on said frame, said belts having their laterally inward flights in yielding mutual engagement, said belts comprising pluralities of laterally outwardly spring-pressed grips arranged so that said laterally inward flights pair the grips in mutual opposition to grip the opposite sides of beets or the like as said flights move rearwardly, and upper and lower knives arranged above and below the belts and against which the beets are forced to sever the tops and roots thereof, and operating means operatively connecting the belts to said power wheel whereby the belts are operated as the machine is drawn forwardly over the ground.

2. A machine according to claim 1 wherein said belts each consist of upper and lower link chains with spring mounting plates pivoted at the junctions of the links, upper and lower pairs of helical laterally projecting springs anchored on said spring mounting plates, said grips consisting of generally rectangular plates having their laterally outward sides concaved to receive the beets or the like, with the outer ends of the springs attached adjacent the corners of the plates.

3. An ambulatory machine for digging beets or the like out of the ground and conveying the dug beets or the like rearwardly and cutting the tops and roots therefrom and discharging the topped and rooted beets at the rear of the machine, said machine comprising a chassis frame having a pair of rearwardly placed ground engaging wheels one of which is a drive wheel, a forwardly placed vertically adjustable caster wheel supporting the front part of the chassis frame on the ground, a beet digging and elevating shovel consisting of a downwardly and forwardly depressed plow mounted at the forward part of the chassis frame with rearwardly inclined beet guiding means thereon, a pair of side by side endless conveyor belts on said frame, said belts having their laterally inward flights in yielding mutual engagement, said belts comprising pluralities of laterally outwardly spring-pressed grips arranged so that said laterally inward flights pair the grips in mutual opposition to grip the opposite sides of beets or the like as said flights move rearwardly, and upper and lower knives arranged above and below the belts and against which the beets are forced to sever the tops and roots thereof, and operating means operatively connecting the belts to said power wheel whereby the belts are operated as the machine is drawn forwardly over the ground, said operating means comprising front and rear vertical axis toothed cages rotatably mounted on the chassis frame for each belt, a driven shaft geared to and between the rear cages, a releasable clutch on said driven shaft, said clutch involving a sprocket connection with said power wheel.

JEROMAIE ROMINE.